3,208,853
ANIMAL FEED COMPOSITION FOR PREVENTION OF MYCOTOXICOSES AND METHOD FOR PREPARING SAME
Joseph Forgacs, Pearl River, N.Y., assignor to American Cyanamid Company, Stamford, Conn., a corporation of Maine
No Drawing. Filed Jan. 23, 1963, Ser. No. 253,283
4 Claims. (Cl. 99—4)

This application is a continuation-in-part of my copending application Serial No. 850,075, filed November 2, 1959, now abandoned, which is a continuation-in-part of my application Serial No. 582,323, filed May 3, 1956, now abandoned.

This invention relates to cereal compositions wherein the elaboration of fungal metabolic by-products, which are toxic to animals ingesting the same, is inhibited. Furthermore, the invention is adapted to animal feed compositions containing 2-bromo-5-nitrothiazole for the prevention of mycotoxicoses in domestic livestock and other animals.

Poultry hemorrhagic syndrome is an example of a mycotoxicoses and is characterized by certain abnormal clinical symptoms and by hemorrhages in the legs, thighs and other organs, as well as by degenerative changes in the liver and kidneys, and by a pronounced depression of the blood-forming tissues.

Although death losses as a result of the hemorrhagic syndrome range from 0 to over 50 percent of the afflicted birds and morbidity up to 90 percent, the significance of this disease has even greater economic implications. Many chickens which may appear clinically normal are downgraded during dressing, because of hemorrhages in the musculature of the legs, thighs and breast.

In the past, various theories have been advanced as possible causes of this elusive disease, but with no conclusive evidence that any of the advanced theoretical factors has been responsible for the classical field syndrome. For example, one of the most popular theories centers on avitaminosis K induced by sulfaquinoxaline toxicity, or by antagonism of this coccidiostat or other drugs to vitamin K. However, the fact that the syndrome has occurred in the complete absence of sulfaquinoxaline or other drugs regarded as antimetabolitic to vitamin K precludes this theory. The avitaminosis K theory is invalidated further by the fact that very little beneficial response was elicited from the administration of therapeutic quantities of vitamin K to the afflicted birds. Therefore, methods used in the past for the amelioration of this hemorrhagic disease have not been successful.

I have discovered that toxic elaborated products as the result of growth of fungi on cereals fed to animals are the basic cause of this hemorrhagic disease. Thus, the hemorrhagic syndrome may be classified as being a mycotoxicoses, which is a toxemia produced in animals that have consumed toxic substances secreted by fungi. The relationship of the toxic fungal metabolic products to the hemorrhagic syndrome has been confirmed conclusively by production of the hemorrhagic syndrome under laboratory and field conditions.

Therefore, a principal object of my invention is the prevention of those maladies associated with ingestion of cereals, hereinafter defined, such as straw, hay, grain, and processed feed on which fungi proliferate as saprophytes and give rise to toxic products, either by secretion of metabolic products into the substrata, or by the toxic substance being present as an endotoxin in the mycelium or in the fruiting bodies of the fungus. Because of the possibility that small portions of infected cereals may stand for a considerable period of time before they are ingested, it is necessary that the cereals be protected against development of toxic fungal metabolic by-products for a long period of time under adverse conditions. It is with the prevention of such cereal borne intoxication that the present invention is particularly concerned. As used in this specification, the term cereal shall mean any grass yielding grain such as corn, wheat, or rice, also the grains so produced; a prepared foodstuff of grain such as oatmeal or bran; the conversion product such as bread, as well as compositions thereof, and to include fabaceous plants and their products such as peanuts, soybeans, peanut meal and soybean meal and others.

Once having determined the etiology of the hemorrhagic syndrome and having classified it as a mycotoxicoses, I then discovered that the production of toxic materials, or at least toxic levels of these materials, could be suppressed by the addition of 2-bromo-5-nitrothiazole to the cereal substrate. I further discovered that this could be accomplished by the addition of 10 to 500 p.p.m. of the 2-bromo-5-nitrothiazole to the cereal substrate. The preferred concentration being within the range of 30 to 300 p.p.m.

It has been found that the occurrence of mycotoxicoses can be prevented by the use of 2-bromo-5-nitrothiazole in less than fungicidal concentrations. True mechanism of activity is unknown; however, it is believed that small amounts of the 2-bromo-5-nitrothiazole interfere with the metabolism of the fungi and thereby prevent the elaboration of toxic by-products. While there may be a proliferation of the fungi in the cereal, a subsequent ingestion of the infected cereal with less than fungicidal concentrations of 2-bromo-5-nitrothiazole does not produce manifestations of mycotoxicoses.

Therefore, the invention relates to a cereal composition, containing a cereal which when infected with fungi is normally capable of producing toxic levels of metabolic by-products in conditions of relatively high humidity, and a concentration of 2-bromo-5-nitrothiazole, which is within the range of 10 to 500 p.p.m.

For the reasons outlined above, a concentration of 10 to 400 p.p.m. in poultry feed, for example, does not necessarily suppress profuse fungal proliferation in inoculated feed; however, an ingestion of this feed by chicks does not result in any manifestations of the poultry hemorrhagic syndrome. Therefore, although there may be profuse fungal proliferation in the inoculated feed, there is sufficient suppression of the poultry hemorrhagic syndrome.

Although the invention is not limited to a particular group of fungi, the following have been observed as being capable of producing mycotoxicoses. Typical of such fungi are: *Aspergillus clavatus, Aspergillus flavus, Aspergillus chevalieri, Aspergillus fumigatus, Penicillium rubrum, Penicillium purpurogenum,* other strains of Penicillium and Alternaria species. Certain Fusarium and Mucorales are also sometimes found. Undoubtedly there exist other toxic fungi which have not as yet been isolated and identified. Mycotoxicoses have been suppressed by the use of a 2-bromo-5-nitrothiazole in concentrations of 10 to 500 p.p.m., in cereals which have been inoculated with suspensions of the aforementioned fungi.

The following examples are provided for illustrative purposes and may include particular features of the invention. However, the examples should not be construed as limiting the invention, many variations of which are possible without departing from the spirit or scope thereof.

EXAMPLE 1.—PREPARATION OF ANIMAL FEED FOR HEMORRHAGIC SYNDROME STUDY

Eight kilograms of non-sterile broiler mash were weighed and the moisture content of the feed determined by means of a Delmhorst Moisture Detector. To the sample were added 40 ml. of an aqueous suspension of a mixture of toxic fungi (*Alternaria sp.*, *Aspergillus clavatus*, *Aspergillus fumigatus*, *Aspergillus flavus*, *Aspergillus glaucus*, *Penicillium rubrum* and two unidentified species of Penicillia) and sufficient tap water free of chlorine to bring the total moisture content of the feed to approximately 21 percent. The fungi had been isolated from feed and litter obtained from broiler houses in which the poultry hemorrhagic syndrome was enzootic. The moistened sample was then premixed by hand, rubbed through a 1/8 inch mesh stainless steel screen and mixed mechanically for 5 minutes in a Hobart feed mixer.

The sample was then divided into two lots, and to a small portion of one of the lots a small quantity of 2-bromo-5-nitrothiazole was added. After thoroughly premixing the 2-bromo-5-nitrothiazole with a spatula, more feed was added from the lot from which the small portion was taken, and premixed by hand until the whole lot was premixed, and this was continued until the 2-bromo-5-nitrothiazole content was 300 p.p.m., based on the weight of the moist feed. The lot containing the 2-bromo-5-nitrothiazole (Lot 2) was then further mixed mechanically for 5 minutes in the Hobart feed mixer. Lot 1, which contained no 2-bromo-5-nitrothiazole, served as a control. Both sample lots were then transferred to round fiberboard containers, equipped with a gauze-covered opening in the lid for ventilation, and incubated at ordinary room temperatures. The sample lots were observed periodically for gross and microscopic proliferation of fungi.

After 14 days, a very heavy fungal growth and formation of fruiting bodies was observed in Lot 1. After 18 days, there was a heavier fungal growth observed and further formation of fruiting bodies in Lot 1, and no growth was observed in Lot 2. On the 25th day both sample lots were removed and dried for 48 hours in incubators adjusted to approximately 45° C.

EXAMPLE 2.—DETERMINATION OF THE EFFICACY of 2-BROMO-5-NITROTHIAZOLE IN THE PREVENTION OF MYCOTOXICOSES

During the early stages of the poultry hemorrhagic syndrome, the affected birds show signs of depression, diarrhea which is frequently bloody, paleness of combs and wattles, anorexia and varying morbidity and mortality. Autopsy findings in such birds reveal hemorrhages and congestion in the musculature of the legs, thighs and breast, and in many other tissues, as well as erosion of the mucosa of the proventriculus and gizzard. The other tissue changes are characteristic of an acute degenerative condition in the liver and kidneys.

Autopsy findings, in birds which have progressed to the advanced syndrome, will reveal blood pigments in the liver, proteinaceous and hematogenous casts in the distal convoluted and collected tubules of the kidneys, and paleness, and gelatinization of, and depression in, the blood-forming elements in the bone marrow.

Two groups of New Hampshire-Red Barred Rock cross, day-old chicks, 20 per group, were fed ad libitum, respectively, the following lots of feed: the inoculum-containing lot with 300 p.p.m. of 2-bromo-5-nitrothiazole, hereinafter called Lot 2, and the inoculum-containing lot, without the 2-bromo-5-nitrothiazole, Lot 1.

On the fourth day of feeding, chicks in the group which were being maintained on the feed of Lot 1, showed signs of the early symptoms of the hemorrhagic syndrome, that is, depression and fetid diarrhea. This condition prevailed until the 17th day when depression was no longer observed; however, diarrhea in this group was observed on the 21st day. Thereafter, chicks in this group grossly appeared normal.

The second group of chicks which were maintained on the feed of Lot 2, in which 2-bromo-5-nitrothiazole was added, showed none of the early symptoms of the hemorrhagic syndrome. The chicks of this group grossly appeared normal for the full period of the test.

Additional lots of feed were prepared following the procedure set forth hereinabove. At the end of four weeks, the supply of feed was exhausted, and 10 chicks from each group were sacrificed by decapitation, and examined grossly at autopsy for manifestations of the syndrome.

These test results show that there is suppression of the hemorrhagic syndrome. This is shown by the autopsy, as well as by gross observation which revealed a pronounced suppression of the hemorrhagic syndrome.

Attempting to achieve greater lucidity, as well as speed, in the interpretation of the results of the autopsy, an arbitrary "hemorrhagic syndrome" score was assigned to the twelve organs examined at autopsy. A normal organ is given the value zero, slight manifestations 1, moderate manifestations 2, pronounced manifestations 3. The score is then totaled for each of the carcasses examined, and a mean score is determined by dividing the total score of all the carcasses examined by the number of carcasses. The results of the autopsy of the two groups of chicks are set forth in the following table:

*Table 1*

|  | Lots Tested | |
| --- | --- | --- |
|  | Lot 1 Feed+Inoculum | Lot 2 Feed+Inoculum +2-bromo-5-nitrothiazole, 300 p.p.m. |
| Number of Chicks Autopsied | 10 | 10 |
| Total "Hemorrhagic Syndrome" Score | 160 | 71 |
| Mean "Hemorrhagic Syndrome" Score | 16 | 7 |

EXAMPLE 3.—COMPARATIVE STUDIES OF THE EFFICACY OF LESS THAN FUNGICIDAL CONCENTRATIONS OF 2-BROMO-5-NITROTHIAZOLE AND FUNGICIDAL CONCENTRATIONS OF 2-BROMO-5-NITROTHIAZOLE ON THE SUPPRESSION OF THE HEMORRHAGIC SYNDROME

Nine lots of non-sterile broiler mash containing no antibiotic of coccidiostat were inoculated with a mixture of toxic fungi (*Alternaria sp.*, *Aspergillus clavatus*, *Aspergillus fumigatus*, *Aspergillus flavus*, *Aspergillus glaucus*, *Paecilomyces varioti*, *Penicillium purpurogenum*, *Penicillium rubrum*, and three unidentified species of Penicillia), adjusted to 21.8 percent moisture, and containing respectively, 0, 10, 50, 100, 200, 250, 300, 400 and 500 p.p.m. of 2-bromo-5-nitrothiazole, were incubated at ordinary room temperatures, observed for fungal proliferation over a period of 13 to 14 days, then dried and fed to day-old chicks, 10 animals per group. The chicks, which were maintained on batteries, had free access to water and the prepared feeds, and were observed daily for gross manifestation of toxicity and weighed periodically until the supply of feed became exhausted in any one group. After 4 weeks the feed supply in one group became exhausted. At this time, all chicks in each group were sacrificed by decapitation and examined at autopsy for gross manifestation of poultry hemorrhagic syndrome.

The degree of fungal proliferation in the feed samples, observed during the experiment, appears in the following table. The degree of fungal proliferation is designated as follows:

0, no growth
1, slight growth
4, profuse growth

As indicated in the following table, the lots of feed containing from 0 to 100 p.p.m. of 2-bromo-5-nitrothiazole showed profuse fungal proliferation after 14 days. Slight growth was observed in the lots containing 200–300 p.p.m. of 2-bromo-5-nitrothiazole after 14 days. No fungal growth was observed in the samples containing 400 and 500 p.p.m. of 2-bromo-5-nitrothiazole.

*Table 2*

| Concentration Compound (p.p.m.) | Growth on Days Indicated, Days | | | |
|---|---|---|---|---|
| | 6 | 8 | 10 | 14 |
| 0 | 1 | 4 | 4 | 4 |
| 10 | 1 | 4 | 4 | 4 |
| 50 | 1 | 1 | 4 | 4 |
| 100 | 0 | 1 | 1 | 4 |
| 200 | 0 | 0 | ? | 1 |
| | 6 | 8 | 11 | 13 |
| 250 | 0 | 0 | 0 | 1 |
| 300 | 0 | 0 | 0 | 1 |
| 400 | 0 | 0 | 0 | 0 |
| 500 | 0 | 0 | 0 | 0 |

It can be conclusively stated, as a result of autopsy findings, that although the 2-bromo-5-nitrothiazole did not suppress fungal proliferation in the lots containing 10–400 p.p.m. of the compound, the chicks that consumed these lots showed a pronounced suppression of the hemorrhagic syndrome. It has been observed in many experiments that chicks used as controls and which received so-called "normal" feed as it is purchased on the open market, at autopsy, had an average hemorrhagic score of 4 to 5. Thus, the mean scores of 5 for 50 p.p.m. level, as well as those for the 250 p.p.m. levels and above can be considered to approximate normal values. It can also be stated that the 2-bromo-5-nitrothiazole in the concentrations tested had no apparent effect on gain in body weight. The results of the autopsy are set forth in the following table, again utilizing the arbitrary "hemorrhagic syndrome" score set forth hereinabove.

*Table 3*

| | Concentration of Compound (p.p.m.) | | | | | | | |
|---|---|---|---|---|---|---|---|---|
| | 0 | 10 | 50 | 100 | 200 | 250 | 300 | 400 | 500 |
| Number of Chicks Autopsied | 10 | 10 | 10 | 10 | 10 | 10 | 10 | 9 | 10 |
| Total "Hemorrhagic Syndrome" Score | 160 | 89 | 52 | 71 | 55 | 50 | 47 | 26 | 30 |
| Mean "Hemorrhagic Syndrome" Score | 16 | 9 | 5 | 7 | 6 | 5 | 5 | 3 | 3 |

EXAMPLE 4.—PRODUCTION OF THE HEMORRHAGIC SYNDROME UNDER FIELD CONDITIONS

The relationship of the toxic fungal elaboration products to the hemorrhagic syndrome was confirmed by an effective production of the hemorrhagic syndrome under field conditions. The relationship was further validated, by concurrently suppressing the hemorrhagic syndrome under field conditions, using the fungicidal concentration of 2-bromo-5-nitrothiazole.

*Production of the hemorrhagic syndrome.*—Normal broiler mash having a moisture content of 12.8 percent, containing no antibiotic or coccidiostat, was inoculated with 0.5 percent of dry inoculum of the mixture of toxic fungi described in Example 1. The feed was then fed to chicks maintained on woodshavings litter on a concrete floor in a building having a total area of 100 square feet. One hundred chicks, 50 males and 50 females, had free access to the feed in hoppers and water in normal watering devices located on the litter. Litter and feed subsequently scattered in the litter by the chicks, were examined periodically by steriomicroscopic means for fungal proliferation, and the chicks observed for gross manifestation of toxicity.

Nineteen days after initiation of the experiment, slight fungal proliferation was observed in feed scattered by the chicks in litter near water devices, and heavy fungal growth was observed three days later. Fungal proliferation gradually became more evident in feed scattered in other parts of the chicken house and was pronounced in feed and litter in all parts of the house by the fourth week.

On the 22nd day of the experiment, slight depression, diarrhea, and paling of combs and wattles were observed in some chicks and became more pronounced in approximately 25 percent of the flock at 4½ weeks. Death began to occur in chicks at 4 weeks and mortality was 10 percent at 5½ weeks.

Gross autopsy findings were typical of those observed in field cases of poultry hemorrhagic syndrome, namely, superficial and deep hemorrhages and congestion in the musculature of the legs, thighs, and breasts; hemorrhages and congestion in the lungs, liver, spleen, kidneys, small intestine and caeca, and pronounced erosion in the proventriculus and gizzard. At 7½ weeks, when the experiment was concluded, moderate depression and fetid diarrhea were observed in practically 100 percent of surviving chicks. Five males and five females sacrificed by decapitation showed gross autopsy findings of severe manifestations of poultry hemorrhagic syndrome having an average "hemorrhagic syndrome" score of 30.

It was also determined that the hemorrhagic syndrome exists in two forms, namely the acute and chronic. The acute form appears after ingestion of large quantities of a highly toxic substrate, and is characterized for the most part by a hemorrhagic diathesis and ploethora, and degenerative changes in the liver and kidneys. When small amounts of toxic feed are administered over a long period of time animals develop various stages of chronic toxicoses. The most outstanding symptom of the final stage of the chronic syndrome is pronounced depression of the haemophoeitic system.

*Suppression of the hemorrhagic syndrome.*—To conclusively prove the relationship of the toxic fungal metabolic by-products to the hemorrhagic syndrome, it is believed that a suppression of the fungal proliferation in feed and litter will concomitantly result in a suppression of the poultry hemorrhagic syndrome in chicks maintained under field conditions which would be substantially the same as those described in the foregoing production of the hemorrhagic syndrome.

To the inoculated feed were added by rubbing through 80-mesh screen, 500 p.p.m. of 2-bromo-5-nitrothiazole, mixed for 15 minutes in a cement mixer and fed to 100 chicks.

Steriomicroscopic examination of litter and feed scattered in litter by the chicks for 9 weeks did not demonstrate fungal proliferation. In addition, during this period the chicks demonstrated no evidence of poultry hemorrhagic syndrome. Five males and five female chicks were sacrificed at this time by decapitation. The autopsy findings resulted in showing that the chicks for all practical purposes were normal, having an actual average syndrome score of less than 1.0. This is a striking comparison to the fact, that as indicated in Tables 1 and 2, the chicks that consumed the feed with the inoculum alone demonstrated an average syndrome score of 16.

I claim:

1. A method of so treating cereals as to prevent the formation therein, by the action of fungi in the presence of moisture of amounts of metabolic by-products that will be toxic to animals ingesting the same, which comprises incorporating into said cereal 10–500 p.p.m. of 2-bromo-5-nitrothiazole.

2. A method according to claim 1 in which the concentration of 2-bromo-5-nitrothiazole is within the range of 30–300 p.p.m.

3. A cereal, which when infected with fungi is normally capable of producing toxic levels of metabolic by-products in conditions of relatively high humidity containing a concentration of 2-bromo-5-nitrothiazole, which is within the range of 10–500 p.p.m.

4. A composition according to claim 3 in which the concentration of 2-bromo-5-nitrothiazole is within the range of 30–300 p.p.m.

No references cited.

A. LOUIS MONACELL, *Primary Examiner.*